United States Patent [19]
Masami et al.

[11] Patent Number: 6,040,888
[45] Date of Patent: Mar. 21, 2000

[54] POSITIONING OF POSTS IN LIQUID CRYSTAL VALVES FOR A PROJECTION DISPLAY DEVICE

[75] Inventors: Shinohara Masami; Mitsuru Uda; Kunio Enami, all of Shiga-ken, Japan

[73] Assignee: International Business Machines Corporation, Armonk, N.Y.

[21] Appl. No.: 08/973,734

[22] PCT Filed: May 29, 1995

[86] PCT No.: PCT/JP95/01031

§ 371 Date: Nov. 14, 1997

§ 102(e) Date: Nov. 14, 1997

[87] PCT Pub. No.: WO96/38755

PCT Pub. Date: Dec. 5, 1996

[51] Int. Cl.[7] .................. G02F 1/1339; G02F 1/1335
[52] U.S. Cl. .................. 349/155; 349/156; 349/5
[58] Field of Search ............... 349/155, 156, 349/5

[56] References Cited

U.S. PATENT DOCUMENTS

| | | | |
|---|---|---|---|
| 4,775,225 | 10/1988 | Tsuboyama et al. | 350/344 |
| 4,999,619 | 3/1991 | Te Velde | 340/784 |
| 5,379,139 | 1/1995 | Sato et al. | 359/81 |
| 5,499,128 | 3/1996 | Hasegawa et al. | 359/81 |
| 5,552,913 | 9/1996 | Shimizu et al. | 359/80 |
| 5,680,189 | 10/1997 | Shimizu et al. | 349/123 |
| 5,739,882 | 4/1998 | Shimizu et al. | 349/123 |
| 5,739,890 | 4/1998 | Uda et al. | 349/156 |
| 5,777,713 | 7/1998 | Kimura | 349/156 |
| 5,828,434 | 10/1998 | Koden et al. | 349/148 |

*Primary Examiner*—William L. Sikes
*Assistant Examiner*—Tarifur R. Chowdhury
*Attorney, Agent, or Firm*—J. P. Sbrollini

[57] ABSTRACT

A liquid crystal display device having pillar-shaped spacers formed in pixel array regions is provided with improved display quality by preventing the degradation of contrast and the occurrence of residual images. A plurality of pillar-shape spacers formed in their pixel array regions are provided at locations which do not overlap with each other when images are projected on the screen using three different liquid crystal light valves to project the red (R), green (G) and blue (B), constituents of images.

16 Claims, 8 Drawing Sheets

POSITIONING OF POSTS IN LIQUID CRYSTAL VALVES FOR A PROJECTION DISPLAY DEVICE

BACKGROUND OF THE INVENTION

1. Technical Field

The present invention relates to a liquid crystal display device and a method for the manufacture thereof, and more specifically, to a projection-type liquid crystal display device using liquid crystal light valves, and a method for the manufacture thereof.

2. Description of the Prior Art

In recent years, a projection type liquid crystal display device has assumed a new prominence as a potential ultra-high definition display device which replaces CRTs. The projection type liquid crystal display device has already been used in HDTV or OEP displays.

The projection optical system of the projection type liquid crystal display device consists of a light source, light valves, a screen, optical filters, and projection lenses. Liquid crystal panels are used as the light valves. Light valves are classified into a transmission type liquid crystal light valve, which transmits light from the light source and projects images on the screen, and a reflection type liquid crystal light valve, which reflects light from the light source and projects images on the screen. Since liquid crystal light valves generally reflect/transmit the lights of three primary colors, red (R). green (G). and blue (B), three light valves are used in a projection type liquid crystal display device.

A liquid crystal display device of the active matrix type consists generally of an array substrate on which there are interconnected switching elements and display electrodes and a counter substrate on which there are a counter electrode facing to the array substrate at a predetermined distance (cell gap) from the array substrate. Liquid crystal material is enclosed between the array substrate and the counter substrate.

In order to achieve desired electro-optical properties of the liquid crystal, the predetermined cell gap must be maintained evenly throughout the entire display surface of the panel. To accomplish this, some display devices use a large number of glass or plastic beads having a diameter of several microns dispersed on the panel as spacers to make the cell gap even. However, this method with using spacers has problems of the uniformity of beads diameters and difficulty in the even dispersion of spacer beads on the panel, as well as the loss of light due to spacers on pixels.

Instead of the above spacer bead dispersion method, a method has been proposed of forming columns consisting of an insulation film and the like in the cell gap as spacers. In this method, columns of a silicon oxide film are formed in the cell gap as spacers (pillar-shape spacers). by using photolithography commonly used in the manufacturing process of semiconductor devices. This method is advantageous compared with the conventional method of using spacer beads in that a cell gap is formed with a high accuracy.

For example, in some reflection type liquid crystal light valves where a silicon substrate is used as the array substrate, an MOS transistor as the switching element and an aluminum (Al) reflecting film connected to said MOS transistor are provided on the array substrate for each element, and a plurality of pillar-shape spacers are formed in the shaded on black matrix region between reflecting films.

In a projection type liquid crystal display device which displays high-definition images on a large screen, the improvement of display brightness is important.

In order to improve display brightness an increase in the numerical aperture of subpixels is considered. In a reflection type liquid crystal light valve, pillar-shape spacers are formed between two reflecting films, and the ends of the spacers override the reflecting films to decrease the reflection area of the reflecting films, causing the numerical aperture of subpixels to lower.

Also in the cell gap forming system using such pillar-shape spacers, even if the overriding of spacers on the reflecting films as described above could be prevented not to affect the numerical aperture, other factors lowering display qualities still remain.

First, where there are pillar-shape spacers formed between reflecting films, the application of an oriented film is affected by projecting pillar-shape spacers. The uneven application of the oriented film makes it difficult to obtain a cell gap which is even throughout the surface, and may cause the cell gap to vary. The regions of varied cell gap do not provide same contrast obtained from the proper cell gap.

Second, reverse tilt occurs in liquid crystals present in the close vicinity of the of the spacers cause reverse tilt due to the pillar-shape spacers. As a result of this disturbance of orientation a discontinuity is observed as a line, known as a disclination line, occurs causing contrast to lower, and residual images to occur.

In a projection type liquid crystal display device, where three light valves are used for three primary colors, red (R), green (G) and blue (B) to display enlarged images on a large screen, decreases in numerical aperture, and contrast due to the variation of the cell gap, and the occurrence of disclination lines are particularly noticable.

The disturbance of liquid crystal orientation of pixels cannot be avoided as long as pillar-shape spacers are present on the pixel region contributing to the display. In high-definition, large-screen projectors, the disturbance of liquid crystal orientation is enlarged, and projected on the screen as the screen becomes larger, causing the increased degradation of the display quality.

It is an object of the present invention to provide improved display quality in a liquid crystal display device comprising pillar-shape spacers formed in the pixel array region by preventing contrast from degrading and residual images from occurring. Another object of the invention is to provide a method for the manufacture of such a liquid crystal display device.

SUMMARY OF THE INVENTION

The above object is achieved by a liquid crystal display device comprising three liquid crystal light valves for displaying images corresponding to red (R), green (G) and blue (B) each having a plurality of pillar-shape spacers formed in the pixel array region for maintaining a prescribed cell gap, wherein, said pillar-shape spacers formed in the pixel array region in each of said three liquid crystal light valves are provided at locations where at least a part of the pillar-shape spacers do not overlap with each other when images ere projected on the screen.

Also, the above object is achieved by a liquid crystal display device, wherein, said pillar-shape spacers formed in the pixel array region in each of said three liquid crystal light valves are provided at locations regularly shifted from each other when images are projected on the screen.

Furthermore, the above object is achieved by a liquid crystal display device, wherein said pillar-shape spacers formed in the pixel array region in each of said three liquid crystal light valves are provided at locations shifted from each other by an equal distance when images are projected on the screen.

Furthermore, the above object is achieved by using a method for the manufacture of a liquid crystal display device comprising steps of, patterning resist layers over said pixel array region by shifting relative to each other substrate side alignment marks, provided on the substrate on which the pixel array region are formed, and mask side alignment marks, provided on the mask for pillar-shape spacers corresponding to said substrate side alignment, for each of pixel array regions for red (R), green (G) and blue (B); etching the underlying insulation film using said patterned resist layer as the mask; and forming a plurality of pillar-shape spacers shifted from each other in each of said pixel array regions for red (R), green (G) and blue (B).

According to the present invention, the influence of pillar-shape spacers on display qualities is dispersed by preventing the locations of a plurality of pillar-shape spacers, formed in each pixel array region of three liquid crystal light valves, from overlapping on the screen. As a result the disturbance of liquid crystal orientation is minimized when images are enlarged and projected by the three liquid crystal light valves.

DETAILED DESCRIPTION OF THE INVENTION

A liquid crystal display device and a method for the manufacture thereof according to an embodiment of the present invention will be described referring to FIGS. 1 to 11.

Figure 1:
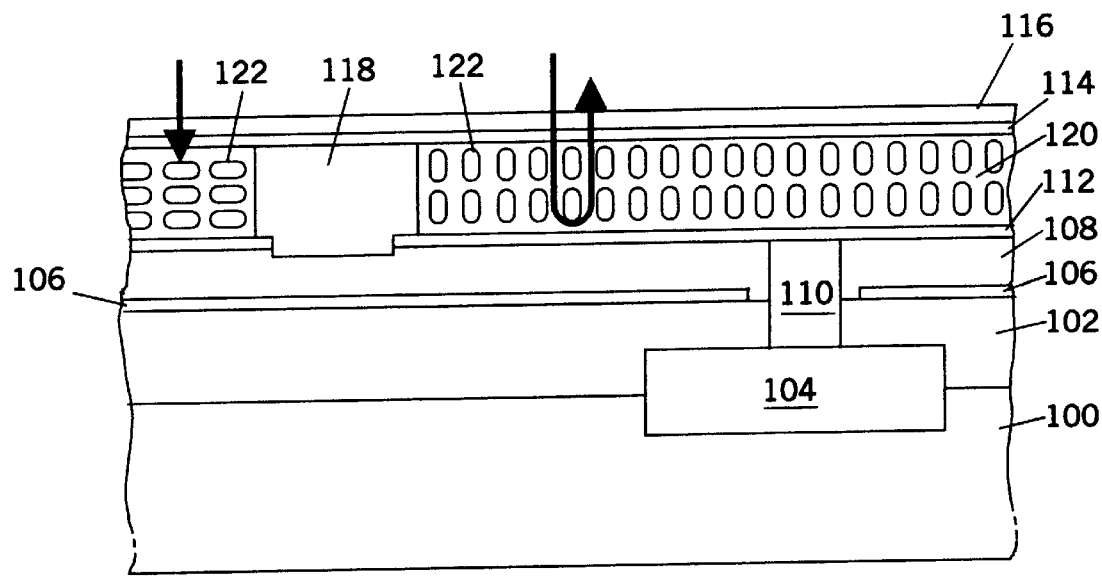
FIG. 1 is a partly sectional view showing two adjacent two pixels of a reflection type liquid crystal light valve used in an embodiment of the present invention.

FIG. 1 is a partly sectional view showing two adjacent pixels of a reflection type liquid crystal light valve used in this embodiment.

A transistor 104, of which detailed diagram is omitted, is formed on a silicon substrate 100. Over the silicon substrate 100 and the transistor 104, a silicon oxide film 102 having a thickness of about 2 µm is formed, and over the silicon oxide film 102, a light absorbing layer 106 is formed. Over the light absorbing layer 106, a silicon nitride film 108 having a thickness of 5,000 Å is formed, over which a light reflecting film 112 consisting of Al having a thickness of 1,500 Å is formed.

The light reflecting film 112 is connected to the source electrode (not shown) of the transistor 104 by a tungsten (W) stud. 110 buried in the through hole formed through the silicon oxide film 102 and the silicon nitride film 108, and also acts as the display electrode for driving liquid crystals. One light reflecting film 112 constitutes the subpixel of one display pixel.

No Al layers are formed between light reflecting films 112 adjacent to each other (distance: about 1.7 µm), and as FIG. 1 shows, the pillar-shape spacers 118 of a silicon oxide film of a height of about 5 µm are formed between specified light reflecting films 112.

In the sectional diagram of FIG. 1, about 1 µm of the pillar-shape spacer 118 overrides the light reflecting film 112 at both edges. A glass protection substrate 116, which is the counter substrate, is formed on the other end of the spacer 118. A counter electrode 114 is formed over the entire surface of the light reflecting film side of the glass protection substrate 116. Light crystals are enclosed in the cell gap of a thickness of about 5 µm produced by the spacer 118, forming a liquid crystal layer 120.

The transistor 104 is an FET (field-effect transistor) comprising a source electrode, a drain electrode connected to a data line, and a gate electrode connected to a scanning line (not shown), and act as a switching element which supplies voltage, impressed on the data line when the gate is in ON-state, to the light reflecting film 112, which is the display electrode.

Changing the light transmittivity is accomplished by changing the orientation of liquid crystal molecules 122 using voltage impressed between the light reflecting film 112, which is the display electrode, and the counter electrode 114. When the transistor 104 is ON, light incident from the glass protection substrate 116 side is either transmitted to the light reflecting film 112, reflected, and allowed to outgo through the glass protection substrate 116, or not transmitted.

Figure 2:
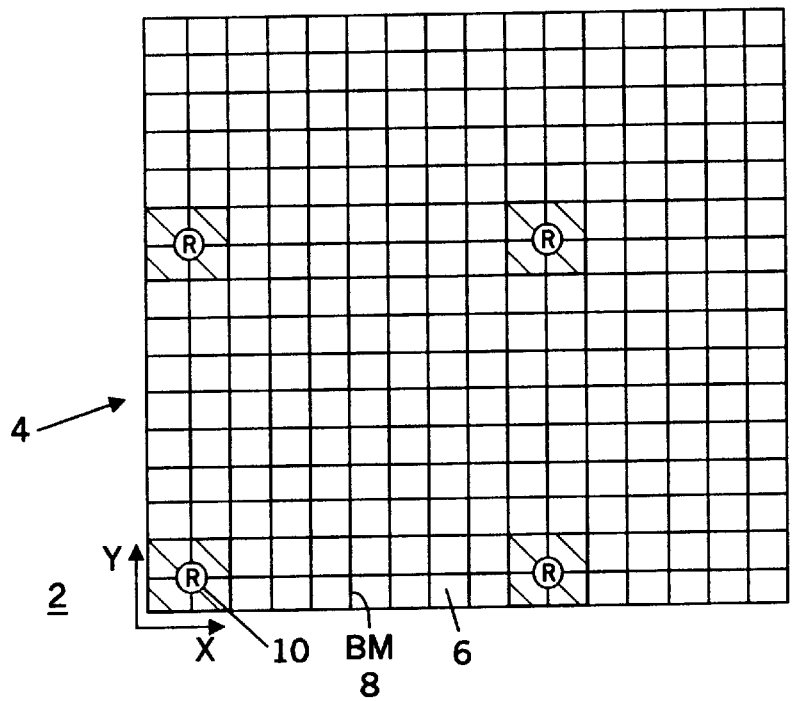
FIG. 2 is a partial top view showing a reflection type liquid crystal light valve for red.
Figure 3:
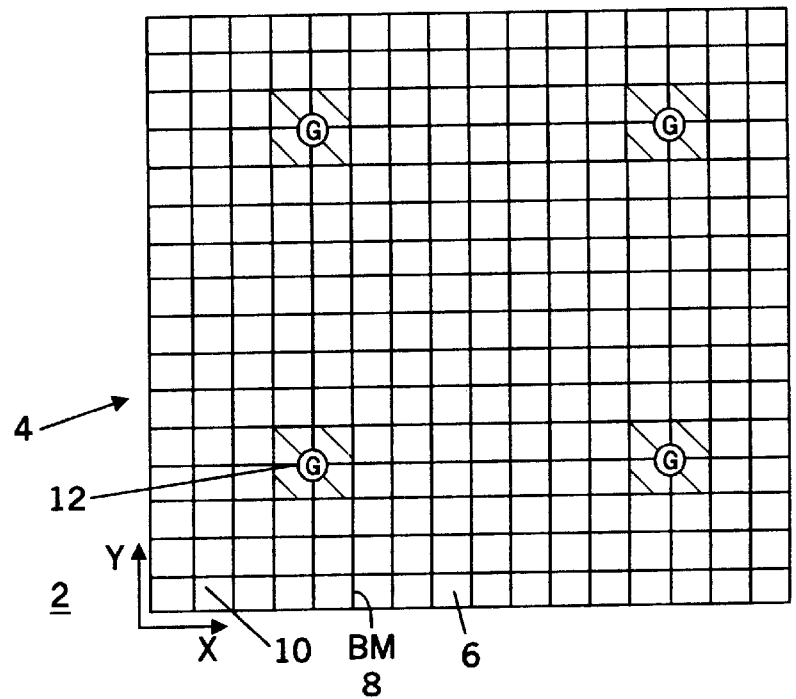
FIG. 3 is a partial top view showing a reflection type liquid crystal light valve for green.
Figure 4:
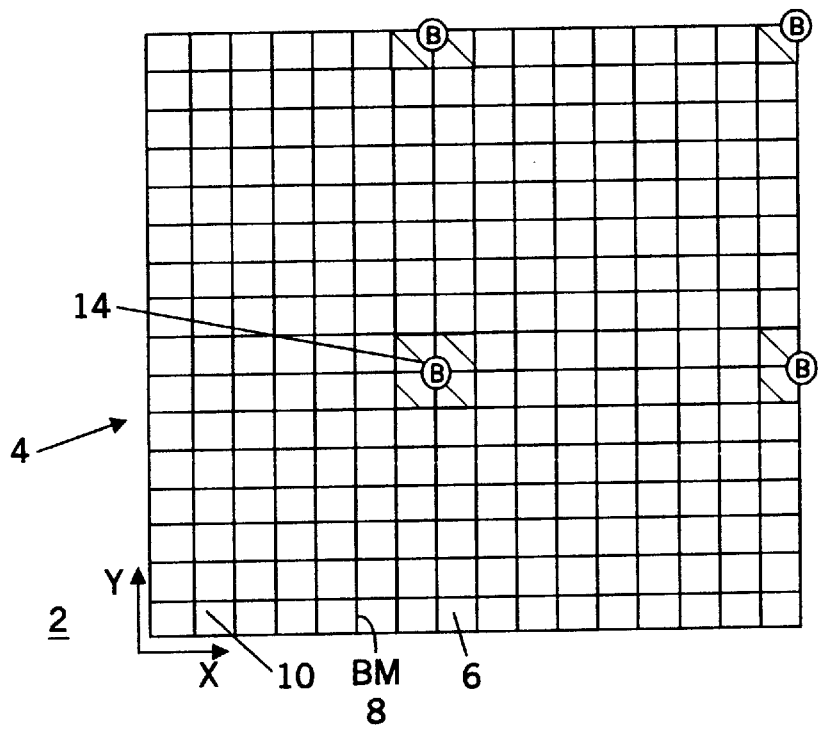
FIG. 4 is a partial top view showing a reflection type liquid crystal light valve for blue.

FIGS. 2–4 are partial top Views showing reflection type liquid crystal light valves. FIG. 2 shows a reflection type liquid crystal light valve for red; FIG. 3 shows a reflection type liquid crystal light valve for green; and FIG. 4 shows a reflection type liquid crystal light valve for blue.

In these figures, the same part of the pixel array region of reflection type liquid crystal light valves is illustrated. A pixel array region 4 is formed on the array side substrate 2 of the reflection type liquid crystal light valve. The pixel array region 4 has pixels as shown in FIG. 1 arranged vertically and horizontally as, for example, in a 2,000×2,000 matrix.

Between adjacent pixels 6, there is a black matrix material 8 forming a light shield region. As shown in FIG. 2, part of each of the pillar-shaped spacers 10 of the reflection type liquid crystal light valve overlies four adjacent pixels 6 and the black matrix material 8 at the intersection of those four pixels.

Therefore the light reflecting area of the light reflecting film in the four pixels 6 on which a part of the pillar-shaped spacers 10 overlies is decreased, and the size of the pixel aperture is reduced.

Also, there may be unevenness on the orientation film of the four pixels 6. Furthermore, disclination lines may occur due to the disturbance of orientation of this region.

The pillar-shaped spacers 10 are positioned each nine pixels in both the row and column directions of the matrix.

Therefore, about 50,000 pillar-shape spacers 10 are formed in the entire pixel array region 4.

In FIGS. 3 and 4, as shown in FIG. 2, pillar-shape spacers 12 and 14 are formed in pixel array regions of reflection type liquid crystal light valves for green and blue, respectively. However, the pillar-shape spacers 12 of the light valve for green are arranged, for example, at three pixel spaces from pillar-shape spacers 10 of the light valve for red shown in the lower left of FIG. 2 in both row (+X) and column (+Y) directions.

Similarly, the pillar-shape spacers 14 of the light valve for blue are arranged at six pixel spaces from pillar-shape spacers 10 of the light valve for red in both row (+X) and column (+Y) directions, therefore at three pixel spaces from pillar-shape spacers 12 of the light valve for green in both row (+X) and column (+Y) directions.

Figure 5:
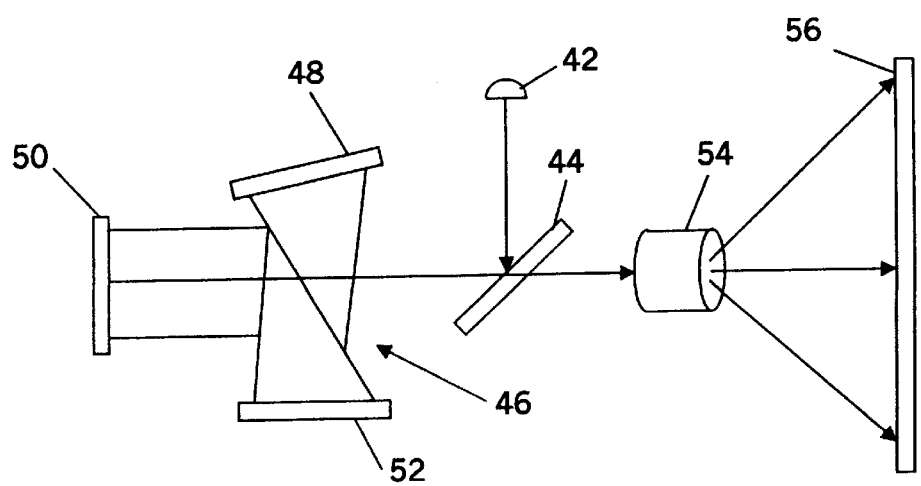
FIG. 5 is a schematic diagram showing a reflection type liquid crystal display device using reflection type liquid crystal light valves according to the embodiment of the present invention.

A projection type liquid crystal display device in which these reflection type liquid crystal light valves for red, green and blue are combined will be described referring to FIG. 5. FIG. 5 is a schematic diagram of a projection type liquid crystal display device using reflection type liquid crystal light valves according to this embodiment.

Light linearly polarized ongoing from the light source 42 is reflected by a polarizing beam splitter 44, and enters in a color separation prism 46, where it is separated into three primary colors of red (R), green (G) and blue (B), which are incident to reflection type light valves for red (R), green (G) and blue (B) 48, 50 and 52, respectively.

The light, brightness modulated for each subpixel by each reflection type liquid crystal light valve is reflected and again enters in the color separation prism 46, where it becomes linearly polarized light deviated by 90 degrees from the original polarized light, and is incident to the polarized beam splitter 44. The reflected lights form reflection type liquid crystal light valves 48, 50 and 52 are incident to the projection lens 54 through the polarized beam splitter 44, enlarged, and projected on to the screen 56.

Figure 6:
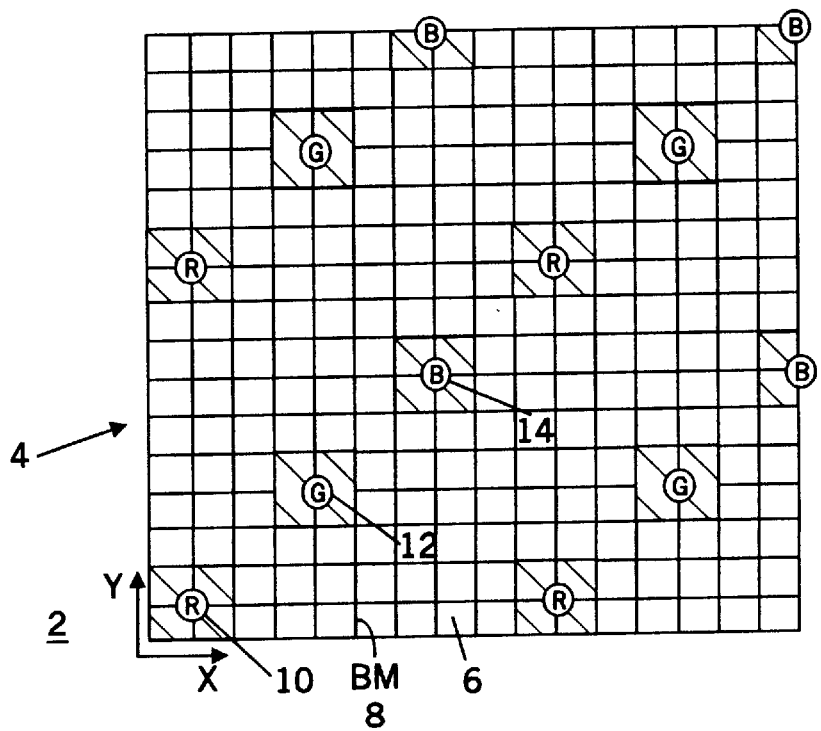
FIG. 6 is a perspective projection of piled pixel array regions 4 of three light valves shown in FIGS. 2–4.

FIG. 6 is a perspective projection of piled pixel array regions 4 of three light valves shown in FIGS. 2–4. By placing pillar-shape spacers 10, 12 and 14 as described above, all the spacers are arranged with regular deviation without overlapping. That is, when images are projected using the projection type liquid crystal display device, the images are projected on to the screen 56 in the state shown in FIG. 6.

Be arranging the pillar-shape spacers of liquid crystal light valves for the three colors, the influence of pillar-shape spacers, such as a decrease in numerical aperture, uneven orientation films, and the occurrence of disclination due to the disturbance of orientation, is dispersed, and the problems such as the reduction of contrast on projecting or residual images are practically eliminated.

Next, a method for the manufacture of the reflection type liquid crystal light valves used in this embodiment will be described referring to FIGS. 7 to 11.

The unique feature in the method for the manufacture of the reflection type liquid crystal light valves according to this embodiment is the method for forming pillar-shape spacers, is described. However conventional manufacturing steps such as the formation of elements in the array substrate side, bonding the array substrate after pillar-shape spacers have been formed to the counter substrate, and the injection of liquid crystals, are omitted.

Figure 7:
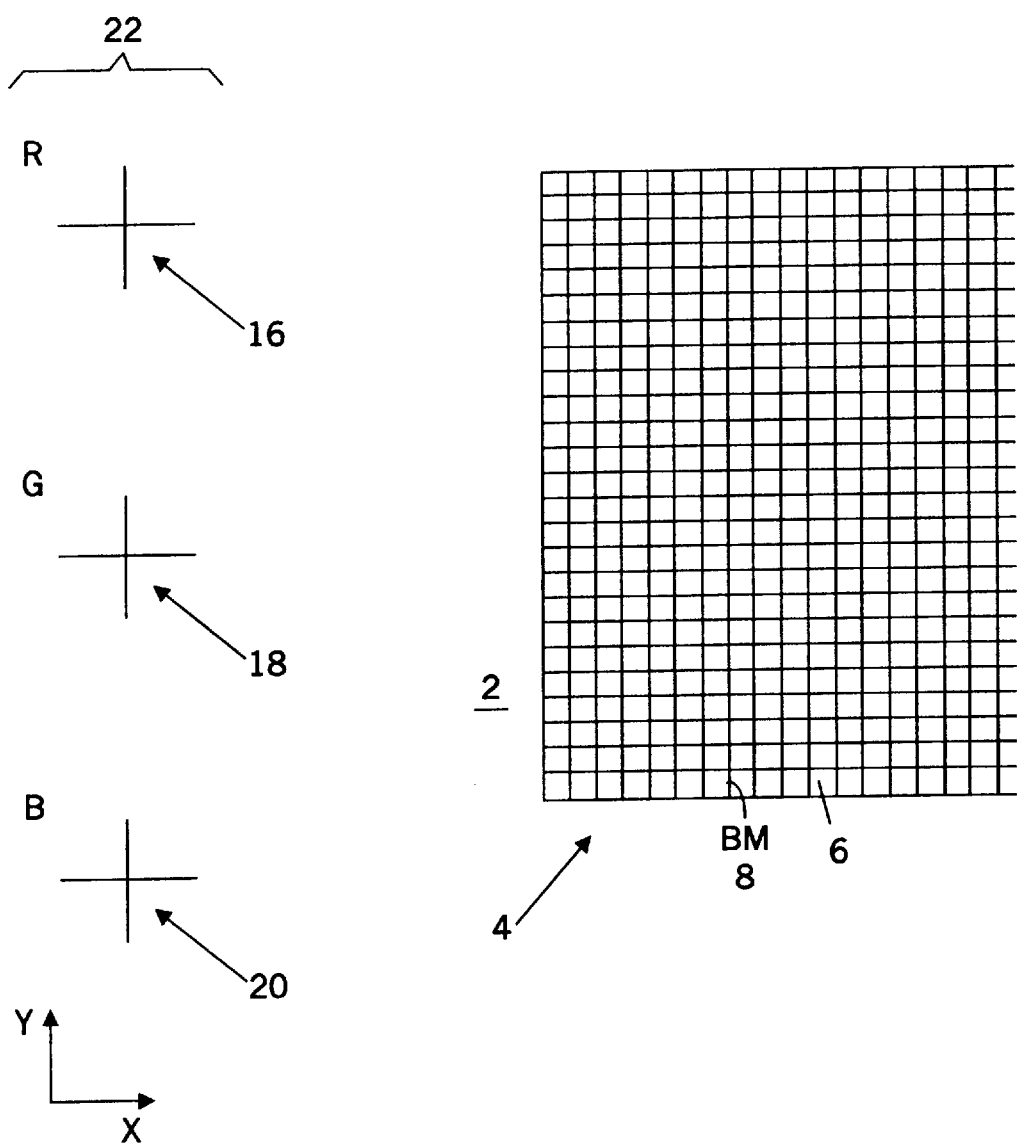
FIG. 7 is a top view showing a part of the pixel array regions 4 formed on the surface of the silicon substrates 2.

FIG. 7 is a top view showing a part of the pixel array region 4 formed on the surface of a silicon substrate 2. Almost square light reflecting films 6 are formed in the pixel array region 4 as a matrix, and black matrices 8 having a light shielding function are formed between light reflecting films 6. A scribe line (not shown), used in cutting the substrate in the subsequent process, is formed in the Y-axis direction to the left of the pixel array region 4, and the alignment marks 22 in the array substrate side used in the formation of pillar-shape spacers are patterned in the prescribed locations in the scribe line.

The alignment marks 22 in the array substrate side comprise alignment submarks 16, 18 and 20 used for forming prescribed pillar-shape spacers in reflection type liquid crystal light valves for red (R), green (G) and blue (B). These submarks are arranged, in this embodiment, in the Y direction in the order of blue, green and red from the bottom with a distance of 13 pixels between them.

Figure 8:
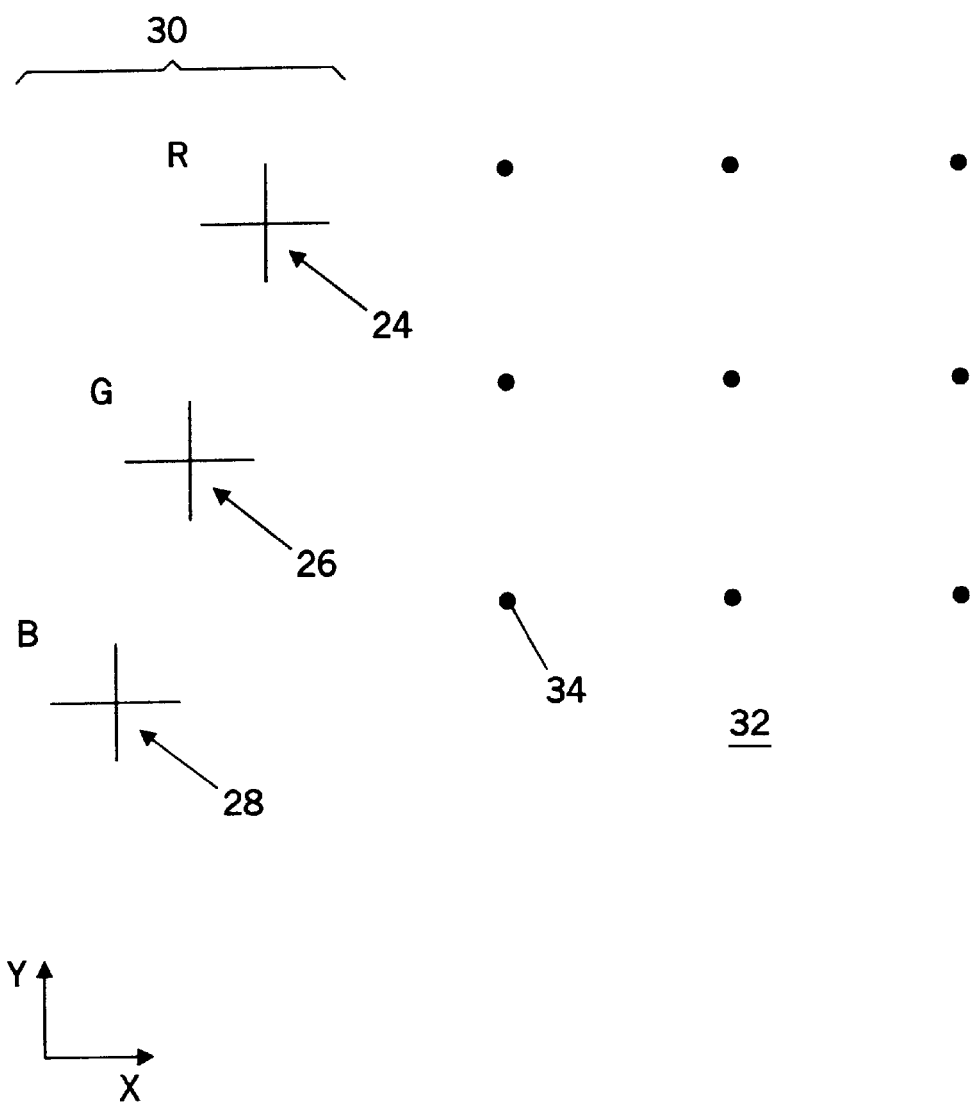
FIG. 8 is a diagram showing the patterning mask 32 of pillar-shape spacers used in the embodiment of the present invention.

FIG. 8 shows the patterning mask 32 of pillar-shape spacers used in this embodiment. The spacer mask 32 consists, for example, of a transparent glass substrate, on which circular patterns 34 are formed, for example, of chromium for patterning pillar-shape spacers in a matrix. The pattern 34 is repeated every nine pixels in this embodiment.

The alignment marks 30 of the mask side used in the patterning of pillar-shape spacers are formed to the left of the pattern 34 corresponding to alignment marks 22 of the array substrate side shown in FIG. 7.

The alignment marks 30 of the mask side comprise alignment submarks 24, 26 and 28 used for forming prescribed pillar-shape spacers in reflection type liquid crystal light valves for red (R), green (G) and blue (B). These submarks are arranged, for example in this embodiment, in the order of blue, green and red from the bottom left with a distances between them of 3 pixels in X direction and 10 pixels in Y direction.

A silicon oxide film of a thickness, for example, of 5 µm for forming pillar-shape spacers are deposited of the entire surface of the silicon substrate 2 shown in FIG. 7 by the plasma CVD method. Next, a positive photoresist is applied in a thickness, for example, of 4 µm on the entire surface to form a photoresist layer.

The silicon substrate 2, on which the silicon oxide film and the photoresist layer are formed is placed on the X-Y stage of, for example, exposure equipment such as a mask aligner (not shown), and the mask 32 shown in FIG. 8 is set between the stage and the light source of the exposure equipment.

Figure 9:
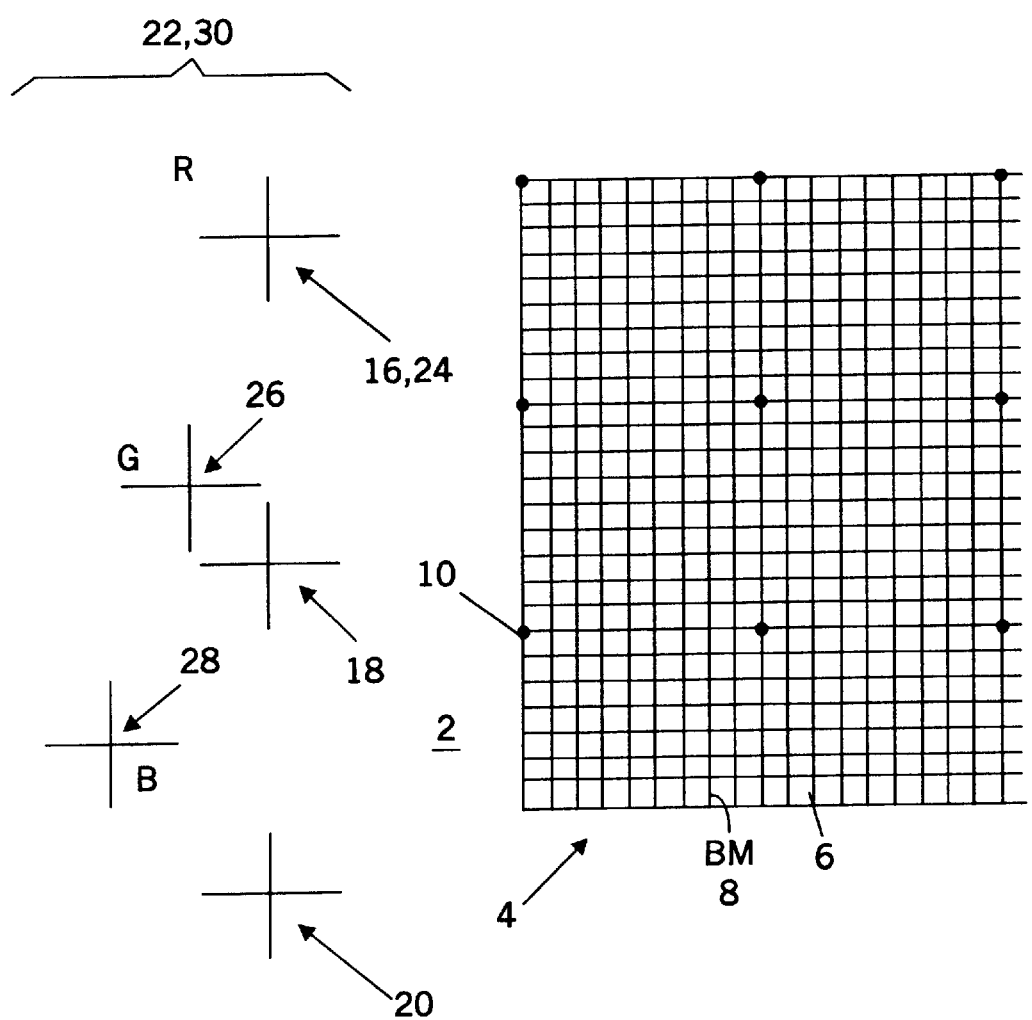
FIG. 9 is a diagram showing patterning of pillar-shape spacers of the liquid crystal light valve for red.
Figure 10:
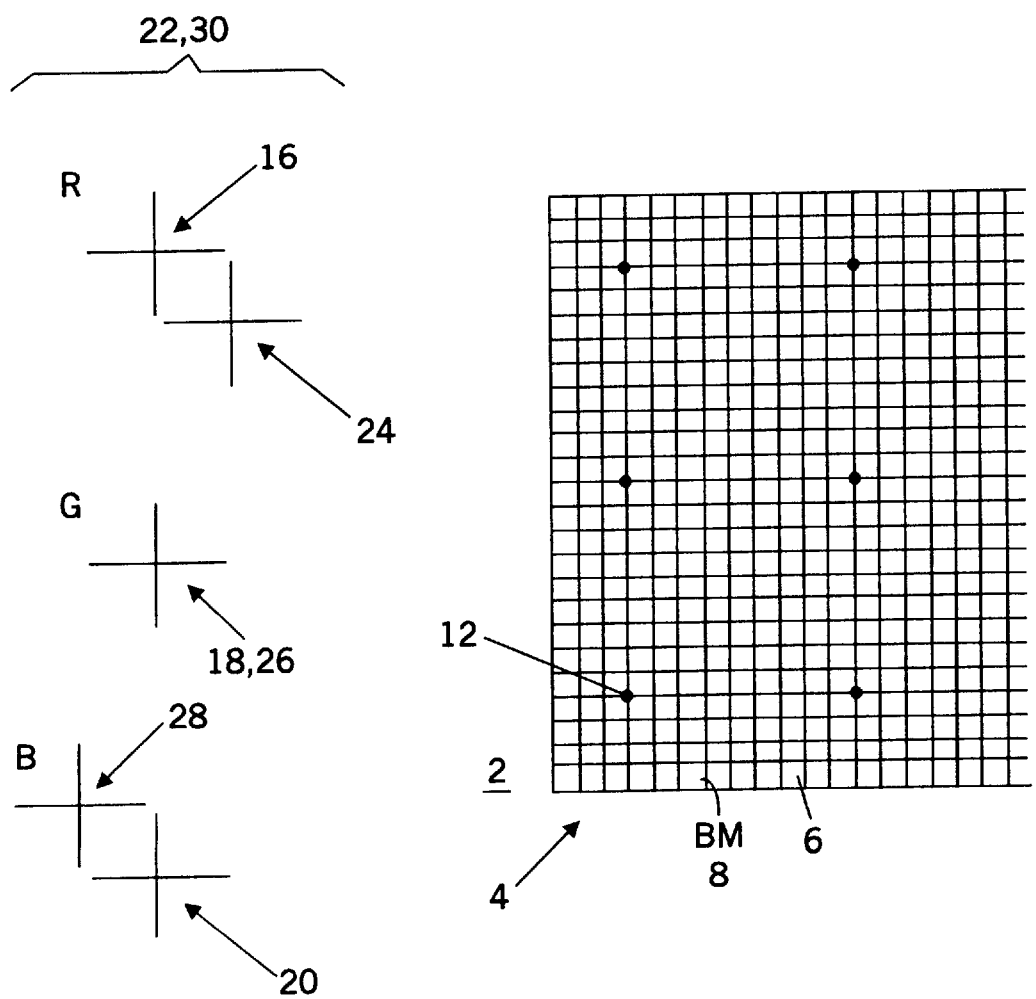
FIG. 10 is a diagram showing patterning of pillar-shape spacers of the liquid crystal light valve for green.

FIG. 9 is a diagram showing the patterning of the pillar-shape spacers of the liquid crystal light valve for red.

The X-Y stage of the exposure equipment is moved to align the alignment submark for red 16 of the substrate side alignment marks 22 with the alignment submark for red 24 of the mask side alignment marks 30, and exposure is performed.

After exposure, patterning is performed to form the resist layer as the etching mask on the pillar-shape spacer forming location. Thereafter, the silicon oxide film is etched using this resist layer as the mask to complete the desired pillar-shape spacer 10.

When the exposure of the substrate for forming the light valve for red has been completed, the substrate is removed from the exposure equipment, another silicon substrate 2 on which a silicon oxide film and the photoresist layer have been formed is loaded on the X-Y stage of the exposure equipment, and the exposure of the substrate for forming the light valve for green is performed.

The X-Y stage of the exposure equipment is moved to align the alignment submark for green 18 of the substrate side alignment marks 22 with the alignment submark for green 26 of the mask side alignment marks 30, and exposure is performed.

After exposure, patterning is performed to form the resist layer as the etching mask on the pillar-shape spacer forming location. Thereafter, the silicon oxide film is etched using this resist layer as the mask to complete the desired pillar-shape spacer 12.

Figure 11:
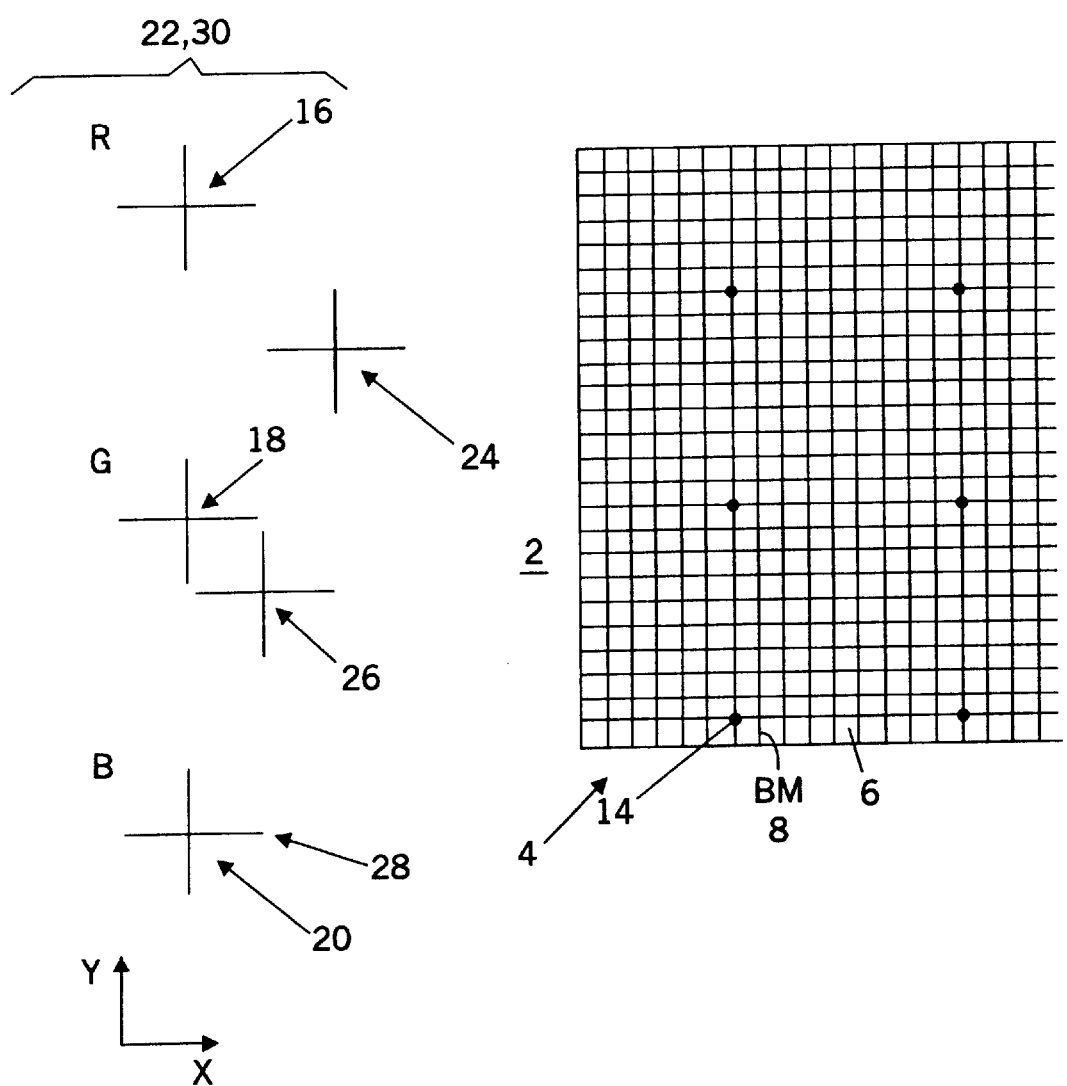
FIG. 11 is a diagram showing patterning of pillar-shape spacers of the liquid crystal light valve for blue.

Further, when the exposure of the substrate for forming the light valve for green has been completed, the substrate is removed from the exposure equipment, another silicon substrate 2 on which a silicon oxide film and the photoresist layer have been formed is loaded on the X-Y stage of the exposure equipment, and the exposure of the substrate for forming the light valve for blue is performer as FIG. 11 shows.

The X-Y stage of the exposure equipment is moved to align the alignment submark for blue 20 of the substrate side alignment marks 22 with the alignment submark for blue 28 of the mask side alignment marks 30, and exposure is performed.

After exposure, patterning is performed to form the resist layer as the etching mask on the pillar-shape spacer forming location. Thereafter, the silicon oxide film is etched using this resist layer as the mask to complete the desired pillar-shape spacer 14.

Thus, according to the method for manufacturing the pillar-shape spacers of this embodiment, the pillar-shape spacers may be formed at prescribed deviated locations in the pixel array regions in liquid crystal light valves for red, green and blue by using a single spacer mask. Since the method for forming the pillar-shape spacers of this embodiment increases few additional steps over conventional methods, and does not require to provide a plurality of masks, the method is also economically advantageous.

The present invention is not limited to the above embodiment, and various variations are possible.

For example, although the locations of pillar-shape spacers of light valves for each color are shifted by prescribed distances, the pillar-shape spacers may be formed at random locations, because it is sufficient as long as the pillar-shape spacers of light valves for each color are formed at locations that do not overlap with each other.

Although the alignment marks are cross-shaped for the ease of description, any shape of marks may be used as long as alignment can be performed practically.

In the above embodiment, although the distance between submarks of array substrate side alignment marks 22 is 13 pixels long in the Y direction, and the distance between submarks of mask side alignment marks 30 is 3 pixels long in the X direction and 10 pixels long in the Y direction, these are not limited to the above values.

In the above embodiment, since the distance between pillar-shape spacers for each color is determined to be 3 pixels long both in X and Y directions, alignment marks may be formed so that the array substrate and the mask are relatively shifted by 3 pixels long both in X and Y directions. That is, the alignment marks shifted from each other corresponding to the Shift amount of pillar-shape spacers for each color may be provided.

Further in the above embodiment, although pillar-shape spacers are patterned by shifting alignment marks on the underlying silicon substrate, the spacer mask may be shifted, or both alignment marks and the spacer mask may be shifted, because underlying alignment marks and the spacer mask side alignment marks may be relatively shifted from each other by prescribed amounts.

Advantages of the invention

As described above, according to the present invention, a liquid crystal display device with improved display properties is provided by preventing the degradation of contrast and the occurrence of residual images.

What is claimed is:

1. A liquid crystal display device comprising three separate liquid crystal light valves for projecting on a screen images corresponding to red, green and blue each light valve having a plurality of pillar-shaped spacers formed in a pixel array region for maintaining a prescribed cell gap, wherein, said pillar-shaped spacers are positioned in the pixel array region in each of said three liquid crystal light valves at locations where at least a part of shadows cast by the pillar-shaped spacers do not overlap with each other in projected images produced by the three valves when they are superimposed on one another on the screen.

2. A liquid crystal display device as set forth in claim 1, wherein, said pillar-shaped spacers formed in the pixel array region in each of said three liquid crystal light valves are located at locations regularly shifted from each other.

3. A liquid crystal display device as set forth in claim 2, wherein, said pillar-shaped spacers formed in the pixel array region in each of said three liquid crystal light valves are provided at locations shifted from each other by an equal distance.

4. A liquid crystal display device as set forth in claim 2, wherein, said pillar-shaped spacers are located in light shielding regions between a plurality of pixels in each of said pixel array regions.

5. The display of claim 1, wherein each of the spacers is at the intersection of a different four pixels in a matrix of pixels in each of the light valves.

6. The method of claim 5, wherein the spacers are arranged at fixed intervals in both an x and y direction in each of the matrices.

7. The method of claim 6, wherein the position of each spacer in each matrix is offset from the position of a corresponding spacer in the other two matrices.

8. The method of claim 7, wherein the spacers are arranged 9 pixels from one another in each of the matrices and the position of each spacer in any one matrix is offset by at least three pixels from the position of any spacer in any other matrix.

9. In a liquid crystal display device having three separate liquid crystal display valves each including a matrix of pixels producing different colored images that are superimposed on one another on a projection screen to produce a multicolored image, the method comprising:

placing support spacers, for maintaining cell gaps in the liquid crystal display valves, at positions in each of the display valves that are displaced from positions of the spacers in the other two valves by positioning each of the spacers at an intersection of a different four pixels in the matrix of pixels in each of the light valves so that part of shadows of images caused by the spacers in one valve do not overlap shadows caused by the spacers in the other two light valves when the colored images produced by the three valves are superimposed on each other on the screen.

10. The method of claim 9, including arranging the spacers at fixed intervals in both an x and y direction in each of the matrices.

11. The method of claim 10, offsetting the position of the spacers in each matrix from the position of the posts in the other two matrices.

12. The method of claim 10, wherein the spacers are arranged 9 pixels from one another in each of the matrices and the position of each spacer in any one matrix is offset by at least three pixels from the position of any spacer in any other matrix.

13. In a liquid crystal display device having three separate liquid crystal display valves each including a matrix of pixels producing different colored images that are superimposed on one another on a projection screen to produce a multicolored image, the method comprising:

placing spacers, maintaining cell gaps in the valves, at positions in each of the display valves that are displaced from positions of the spacers in the other two valves so that part of shadows of images caused by the spacer in one valve do not overlap shadows caused by the spacers in the other two light valves when the colored images produced by the three valves are superimposed on each other on the screen.

14. The method of claim 13, including arranging the posts at fixed intervals in both an x and y direction in each of the matrices.

15. The method of claim 13, offsetting the position of the spacers in each one of the matrices at fixed intervals from the position of a corresponding spacer in the other two matrices.

16. The method of claim 15, wherein the spacers are arranged 9 pixels from one another in each of the matrices and the position of each spacer in any one matrix is offset by at least three pixels from the position of any spacer in any other matrix.

* * * * *